(12) United States Patent
Utsuno et al.

(10) Patent No.: US 11,444,317 B2
(45) Date of Patent: Sep. 13, 2022

(54) SULFIDE SOLID ELECTROLYTE

(71) Applicant: IDEMITSU KOSAN CO., LTD., Chiyoda-ku (JP)

(72) Inventors: Futoshi Utsuno, Sodegaura (JP); Akiko Nakata, Sodegaura (JP); Kota Terai, Sodegaura (JP); Masaru Nakagawa, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 216 days.

(21) Appl. No.: 16/461,235

(22) PCT Filed: Aug. 8, 2017

(86) PCT No.: PCT/JP2017/028791
§ 371 (c)(1),
(2) Date: May 15, 2019

(87) PCT Pub. No.: WO2018/092366
PCT Pub. Date: May 24, 2018

(65) Prior Publication Data
US 2019/0319305 A1  Oct. 17, 2019

(30) Foreign Application Priority Data

Nov. 16, 2016 (JP) .............................. JP2016-222931

(51) Int. Cl.
*H01M 10/0562*  (2010.01)
*H01M 10/0525*  (2010.01)

(52) U.S. Cl.
CPC ... *H01M 10/0562* (2013.01); *H01M 10/0525* (2013.01); *H01M 2300/0068* (2013.01)

(58) Field of Classification Search
CPC ......... H01M 10/0562; H01M 10/0525; H01M 2300/0068
See application file for complete search history.

(56) References Cited

U.S. PATENT DOCUMENTS

| 2010/0290969 A1 | 11/2010 | Deiseroth et al. |
| 2015/0333368 A1 | 11/2015 | Kato et al. |

(Continued)

FOREIGN PATENT DOCUMENTS

| CN | 105098230 A | 11/2015 |
| CN | 105229841 A | 1/2016 |

(Continued)

OTHER PUBLICATIONS

Third Party Observations issued Aug. 27, 2020 in Japanese Patent Application No. 2018-551032 (English Translation only), 10 pages.

(Continued)

*Primary Examiner* — Osei K Amponsah
(74) *Attorney, Agent, or Firm* — Oblon, McClelland, Maier & Neustadt, L.L.P.

(57) ABSTRACT

Provided is a sulfide solid electrolyte containing lithium, phosphorus, sulfur and chlorine, in which a molar ratio of the chlorine to the phosphorus, c (Cl/P), is greater than 1.0 and 1.9 or less, the sulfide solid electrolyte includes an argyrodite-type crystal structure, and a lattice constant of the argyrodite-type crystal structure is 9.820 Å or less.

22 Claims, 2 Drawing Sheets

(56) References Cited

U.S. PATENT DOCUMENTS

| | | | |
|---|---|---|---|
| 2016/0156064 A1 | 6/2016 | Miyashita et al. | |
| 2017/0222257 A1 | 8/2017 | Miyashita et al. | |
| 2017/0352916 A1* | 12/2017 | Miyashita | C01B 25/14 |
| 2018/0016185 A1 | 1/2018 | Nakata et al. | |

FOREIGN PATENT DOCUMENTS

| | | | |
|---|---|---|---|
| CN | 105518923 | A | 4/2016 |
| EP | 3 026 749 | A1 | 6/2016 |
| EP | 3 511 949 | A1 | 7/2019 |
| JP | 2010-540396 | A | 12/2010 |
| JP | 2015-220013 | A | 12/2015 |
| JP | 2016-24874 | A | 2/2016 |
| WO | WO 2015/011937 | A1 | 1/2015 |
| WO | WO 2015/012042 | A1 | 1/2015 |
| WO | WO 2016/067631 | A1 | 5/2016 |
| WO | WO 2016/104702 | A1 | 6/2016 |

OTHER PUBLICATIONS

Extended European Search Report dated Jun. 15, 2020 in European Patent Application No. 17872060.3, 9 pages.

Third Party Observations issued Aug. 27, 2020 in Japanese Patent Application No. 2018-551032, 55 pages.

R. Prasada Rao, et al., "Formation and conductivity studies of lithium argyrodite solid electrolytes using in-situ neutron diffraction," Solid State Ionics, vol. 230, 2013, pp. 72-76.

International Search Report dated Oct. 10, 2017 in PCT/JP2017/028791, 1 pages.

English translation of the International Preliminary Report on Patentability and Written Opinion of the International Searching Authority dated May 31, 2019 in PCT/JP2017/028791 filed Aug. 8, 2017, 8 pages.

Hans-Jörg, Deiseroth, et al., "$Li_6PS_5X$: A Class of Crystalline Li-Rich Solids with an Unusually High $Li^+$ Mobility" Angewandte Chemie International Edition, vol. 47, No. 4, 2008, pp. 755-758 and cover page.

R. P. Rao, et al., "Studies of Lithium Argyrodite Solid Electrolytes for All-Solid State Batteries" Physica Status Solidi A. vol. 208, No. 8, 2011, pp. 1804-1807 and cover page.

Sylvain Boulineau, et al. "Mechanochemical Synthesis of Li-Argyrodite $Li_6PS_5X$ (X= Cl, Br, I) as Sulfur-Based Solid Electrolytes for all Solid State Batteries Application" Solid State Ionics, vol. 221, 2012, pp. 1-5 and cover page.

Prasada Rao Rayavarapu, et al., "Variation in Structure and $Li^+$-ion Migration in Argyrodite-Type $Li_6PS_5X$ (X= Cl, Br, I) Solid Electrolytes" J. Solid State Electrochem., vol. 16, 2012, pp. 1807-1813.

Office Action dated Feb. 14, 2022 in corresponding Chinese Patent Application No. 201780070493.8, 6 pages.

* cited by examiner

SULFIDE SOLID ELECTROLYTE

TECHNICAL FIELD

The invention relates to a sulfide solid electrolyte.

BACKGROUND ART

With rapid spread of information-related equipment or communications equipment such as personal computers, video cameras, and mobile phones in recent years, development of batteries used as a power source thereof has been considered to be important. Among these batteries, a lithium ion battery has attracted attention from a viewpoint of high energy density.

In the lithium ion battery that is currently commercially available, a liquid electrolyte containing a flammable organic solvent is used, and therefore, attachment of a safety device that suppresses an increase in temperature at the time of short circuit, or improvement in structural and material aspects for preventing short circuit is required. On the other hand, in the lithium ion battery formed into all-solid-state battery by using a solid electrolyte in place of the liquid electrolyte, it is considered that the flammable organic solvent is not used in the battery, and therefore, the safety device can be simplified, and the lithium ion battery is excellent in a production cost or productivity.

As the solid electrolyte used in the lithium ion battery, a sulfide solid electrolyte is known. As a crystal structure of the sulfide solid electrolyte, various structures are known. As one of such crystal structures, an argyrodite-type crystal structure is known (Patent Literatures 1 to 5, Non-Patent Literatures 1 to 4).

The argyrodite-type crystal structure provides a highly stable crystal, and some of the structures have high ion conductivity. However, further improvement In ion conductivity is required.

CITATION LIST

Patent Literature

Patent Literature 1: JP-T-2010-540396
Patent Literature 2: WO2015/011937
Patent Literature 3: WO2015/012042
Patent Literature 4: JP-A-2016-24874
Patent Literature 5: WO2016/104702

Non-Patent Literature

Non-Patent Literature 1: Angew. Chem. Int. Ed. Vol. 47 (2008), No. 4, P. 755-758
Non-Patent Literature 2: Phys. Status. Solidi Vol. 208 (2011), No. 8, P. 1804-1807
Non-Patent Literature 3: Solid State Ionics Vol. 221 (2012) P. 1-5
Non-Patent Literature 4: J. Solid State Electrochem., 16 (2012) P. 1807-1813

SUMMARY OF INVENTION

One object of the invention is to provide a new sulfide solid electrolyte having high ion conductivity.

According to one embodiment of the invention, provided is a sulfide solid electrolyte comprising lithium, phosphorus, sulfur and chlorine, wherein a molar ratio of the chlorine to the phosphorus, c (Cl/P), is greater than 1.0 and 1.9 or less, the sulfide solid electrolyte has an argyrodite-type crystal structure, and a lattice constant of the argyrodite-type crystal structure is 9.750 Å or more and 9.820 Å or less.

Further, according to one embodiment of the invention, an electrode mix comprising the sulfide solid electrolyte and an active material is provided.

Further, according to one embodiment of the invention, a lithium ion battery comprising at least one of the sulfide solid electrolyte and the electrode mix is provided.

According to one embodiment of the invention, a new sulfide solid electrolyte having high ion conductivity can be provided.

DESCRIPTION OF EMBODIMENTS

Figure 1:
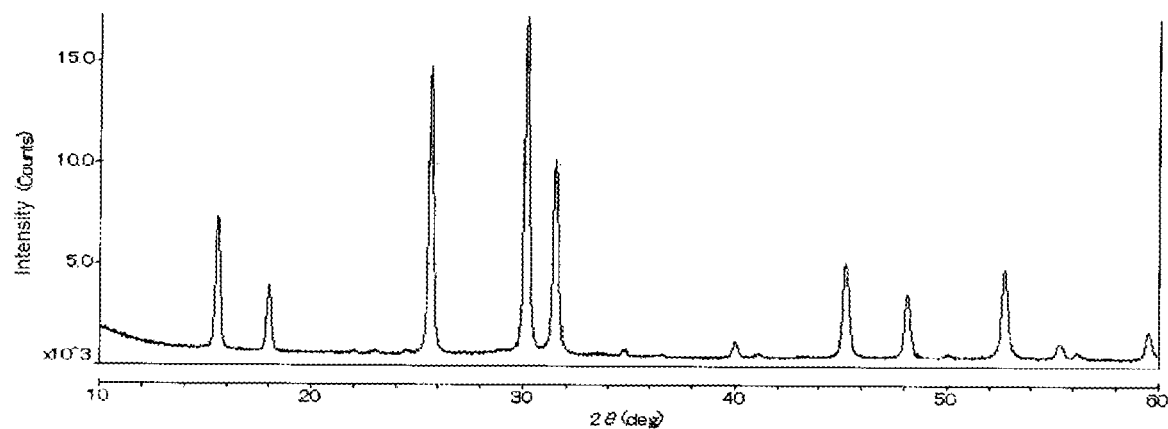
FIG. 1 is an X-ray diffraction (XRD) pattern of the sulfide solid electrolyte obtained in Example 1.

As a first aspect of a sulfide solid electrolyte according to the invention, the sulfide solid electrolyte comprises lithium, phosphorus, sulfur and chlorine, in which a molar ratio of the chlorine to the phosphorus, c (Cl/P), is greater than 1.0 and 1.9 or less. Then, the sulfide solid electrolyte is characterized by having an argyrodite-type crystal structure, in which a lattice constant of the argyrodite-type crystal structure is 9.750 Å or more and 9.820 Å or less.

In the sulfide solid electrolyte of this aspect, the molar ratio of the chlorine to the phosphorus, c (Cl/P), is greater than 1.0, and the lattice constant of the argyrodite-type crystal structure included in the sulfide solid electrolyte is 9.820 Å or less.

It is considered that a small lattice constant of the argyrodite-type crystal structure means that an amount of chlorine included in the crystal structure is large. In general, various crystal components and amorphous components are present in a mixed manner in the sulfide solid electrolyte. A part of the chlorine input as a constituent element of the sulfide solid electrolyte forms the argyrodite-type crystal structure, and the rest of the chlorine forms a crystal structure other than the argyrodite-type crystal structure, and an amorphous component. Further, a case where the rest of the chlorine is contained in a remaining raw material is also considered. The present inventors have found that the lattice constant of the argyrodite-type crystal structure can be reduced by increasing the amount of the chlorine included in the argyrodite-type crystal structure to improve ion conductivity of the sulfide solid electrolyte.

In the sulfide solid electrolyte of this aspect, when a molar ratio "c" is 1.2 or more, the lattice constant of the argyrodite-type crystal structure included in the sulfide solid electrolyte is preferably 9.818 Å or less. Further, when the molar ratio "c" is 1.4 or more, the lattice constant of the argyrodite-type crystal structure included in the sulfide solid electrolyte is preferably 9.815 Å or less. In addition, the molar ratio "c" is ordinarily 1.9 or less, but may be 1.8 or less. Further, the lattice constant of the argyrodite-type crystal structure is 9.750 Å or more and 9.820 Å or less, and is preferably 9.795 Å or more and 9.820 Å or less, and more preferably 9.795 Å or more and 9.815 Å or less.

As a molar ratio of each element and a composition in the sulfide solid electrolyte, a value measured by ICP emission spectrometry is to be used except for special circumstances such as a difficulty in analysis. In addition, a measurement method for the ICP emission spectrometry will be described in Examples.

The molar ratio of each element can be controlled by adjusting a content of each element in a raw material.

The lattice constant of the argyrodite-type crystal structure is calculated from an XRD pattern obtained by an X-ray diffraction (XRD) measurement by conducting a whole pattern fitting (WPF) analysis by using crystal structure analysis software. Details of the measurement will be described in Examples.

The sulfide solid electrolyte of this aspect comprises the argyrodite-type crystal structure. It can be confirmed that the sulfide solid electrolyte comprises the argyrodite-type crystal structure by having diffraction peaks at $2\theta=25.5\pm0.5$ deg and $30.0\pm0.5$ deg in powder X-ray diffractometry using $CuK\alpha$ rays, for example. The diffraction peak is a peak arising from the argyrodite-type crystal structure.

The diffraction peak of the argyrodite-type crystal structure appears at $2\theta=15.6\pm0.5$ deg, $18.0\pm0.5$ deg, $31.4\pm0.5$ deg, $45.0\pm0.5$ deg and $47.9\pm0.5$ deg in several cases, for example. The sulfide solid electrolyte of the invention may have these peaks.

In addition, in the present application, a position of the diffraction peak is judged in the range of $A\pm0.5$ deg or $A\pm0.4$ deg when a median value is taken as A, but the position is preferably $A\pm0.3$ deg. For example, in the case of the above-described diffraction peak at $2\theta=25.5\pm0.5$ deg, the median value A is 25.5 deg and the peak is preferably present in the range of $2\theta=25.5\pm0.3$ deg. The same is also applied to judgement of the positions of all other diffraction peaks in the present application.

Examples of the argyrodite-type crystal structure include crystal structures disclosed in Non-Patent Literature 1 to 3, JP-T-2010-540396, JP-A-2011-096630 and JP-A-2013-211171.

As a second aspect of a sulfide solid electrolyte according to the invention, the sulfide solid electrolyte comprises lithium, phosphorus, sulfur and chlorine, wherein the molar ratio of the chlorine to the phosphorus, c (Cl/P), is greater than 1.0 and 1.9 or less, and the sulfide solid electrolyte has an argyrodite-type crystal structure. Then, the sulfide solid electrolyte is characterized by having a peak in each of regions 80.3 to 81.7 ppm, 82.4 to 83.7 ppm and 84.0 to 85.6 ppm in a solid $^{31}$P-NMR measurement, wherein an area ratio of the peak in the region of 80.3 to 81.7 ppm to a total area of all peaks in the region of 78 to 92 ppm is 40% or more.

In the sulfide solid electrolyte of this aspect, the constituent elements, the molar ratio of the chlorine to the phosphorus, c (Cl/P), and the argyrodite-type crystal structure are the same as in the above-described first aspect.

In the solid $^{31}$P-NMR measurement, the sulfide solid electrolyte of this aspect has a peak in each of regions of 80.3 to 81.7 ppm (hereinafter, referred to as a first region), 82.4 to 83.7 ppm (hereinafter, referred to as a second region) and 84.0 to 85.6 ppm (hereinafter, referred to as a third region). Hereinafter, the peak in the first region is referred to as a first peak ($P_1$), the peak in the second region is referred to as a second peak ($P_2$), and the peak in the third region is referred to as a third peak ($P_3$). Presence of the peak in the region means that a peak having a peak top in the region is present or a peak is present in this region at the time of separation by a nonlinear least-squares method.

In this aspect, a ratio ($S_{P1}\times100/S_{all}$) of an area ($S_{P1}$) of the first peak to the total area ($S_{all}$) of all peaks in the region of 78 to 92 ppm is 40% or more. It is estimated that a high area ratio of the first peak means that the amount of chlorine incorporated into the argyrodite-type crystal structure is large. As a result, the ion conductivity of a solid electrolyte increases.

In the sulfide solid electrolyte of this aspect, when the molar ratio "c" is 1.2 or more, the area ratio of the first peak is preferably 45% or more. Further, when the molar ratio "c" is 1.4 or more, the area ratio of the first peak is preferably 50% or more. In addition, the molar ratio "c" is ordinarily 1.9 or less, but may be 1.8 or less. Further, the area ratio of the first peak is ordinarily 65% or less.

It is known that two of free element sites in which an occupancy rate of chlorine and sulfur is different are present in the argyrodite-type crystal structure ($Li_6PS_5Cl$) in which halogen is chlorine (Non-Patent Literature 4). The free element in the present application means sulfur or halogen surrounded by Li in the argyrodite-type crystal structure. Further, it is reported that a plurality of resonance lines of phosphorus in which chemical shifts are different are observed in an overlapped manner in the solid $^{31}$P-NMR spectrum depending on a difference in a distribution state of free chlorine (Cl) and free sulfur (S) around the $PS_4^{3-}$ structure in the crystal (Non-Patent Literature 1). The present inventors have examined the solid $^{31}$P-NMR spectrum of the argyrodite-type crystal structure in which a ratio of free Cl and free S is different based on these findings. As a result, the present inventors have found that NMR signals observed in the region of 78 to 92 ppm can be separated into three of peaks of the $PS_4^{3-}$ structure in which the distribution state of the free S and the free Cl in the surrounding is different. Further, the present inventors have found that, when an area ratio of the peak on a side of a highest magnetic field (the above-described first peak) is high among the three of peaks, the ion conductivity of the solid electrolyte is high. In addition, from this fact, it is estimated that the first peak is a peak of the $PS_4^{3-}$ structure in which all free elements in the surrounding are Cl.

In this aspect, a ratio ($S_{P3}\times100/S_{all}$) of an area ($S_{P3}$) of a peak ($P_3$) in the region of 84.0 to 85.6 ppm to the total area ($S_{all}$) is preferably 30% or less. It is considered that, if the ratio is within this range, the argyrodite-type crystal structure is formed into a structure in which the number of free S surrounded by Li in the vicinity of the $PS_4^{3-}$ structure is small.

When the molar ratio "c" is 1.2 or more, the area ratio of the third peak is preferably 25% or less. Further, when the molar ratio "c" is 1.4 or more, the area ratio of the third peak is preferably 20% or less. In addition, the area ratio of the third peak is ordinarily 15% or more.

Further, a ratio ($S_{P2}\times100/S_{all}$) of an area ($S_{P2}$) of a peak ($P_2$) in the region of 82.4 to 83.7 ppm to the total area (San) is preferably 20% or more and 35% or less. It is considered that, if the ratio is within this range, the number of free Cl in the vicinity of the $PS_4^{3-}$ structure is estimated to become larger than the number of free S. and therefore, a high ion conductive phase can be obtained. The area ratio of the second peak is more preferably 21% or more and 32% or less, and further, preferably 22% or more and 30% or less.

With regard to identification of the first peak, the second peak and the third peak described above by the solid $^{31}$P-NMR measurement and the areas thereof, the areas are calculated by separating the signals observed in the region of 78 to 92 ppm in the spectrum obtained by the solid $^{31}$P-NMR measurement into each peak by the nonlinear least-squares method, and measuring the area of each peak. Details will be described in the Examples described later. Each peak area indicates abundance of phosphorus in the same surrounding environment.

The sulfide solid electrolyte of the invention only needs to have a structure of the first aspect or the second aspect described above. Further, the sulfide solid electrolyte of the invention may have all the structures specified in the first aspect and the second aspect.

Hereinafter, the sulfide solid electrolytes in the first aspect and the second aspect of the invention are collectively referred to as "sulfide solid electrolyte of the invention".

In the sulfide solid electrolyte of the invention, when a molar ratio of the lithium to the phosphorus is taken as a (Li/P), a molar ratio of the sulfur to the phosphorus is taken as b (S/P), and the molar ratio of the chlorine to the phosphorus is taken as c (Cl/P), it is preferable to satisfy formulas (A) to (C):

$$5.0 \leq a \leq 6.5 \quad (A)$$

$$6.1 \leq a+c \leq 7.5 \quad (B)$$

$$0.5 \leq a-b \leq 1.5 \quad (C)$$

wherein b>0 and c>1.0 are satisfied.

The argyrodite-type crystal structure is easily formed by satisfying formulas (A) to (C).

Formula (A) is preferably in a formula: $5.1 \leq a \leq 6.4$, and more preferably in a formula $5.2 \leq a \leq 6.3$.

Formula (B) is preferably in a formula: $6.2 \leq a+c \leq 7.4$, and more preferably in a formula: $6.3 \leq a+c \leq 7.3$.

Formula (C) is preferably in a formula: $0.6 \leq a-b \leq 1.3$, and more preferably in a formula: $0.7 \leq a-b \leq 1.3$.

Within the range in which advantageous effects of the invention are not adversely affected, the sulfide solid electrolyte of the invention may contain an element such as Si, Ge, Sn, Pb, B, Al, Ga, As, Sb and Bi in addition to the lithium, the phosphorus, the sulfur and the chlorine described above. When the sulfide solid electrolyte contains one or more elements M selected from the group consisting of Si, Ge, Sn, Pb, B, Al, Ga, As, Sb and Bi, a molar ratio of each element in formulas (A) to (C) is taken as a molar ratio based on a total of the element M and the phosphorus. For example, the molar ratio of the lithium to the phosphorus, a (Li/P), is taken as Li/(P+M).

Further, within the range in which the advantageous effects of the invention are not adversely affected, the sulfide solid electrolyte of the invention may contain a halogen element other than the chlorine, or a chalcogen element (oxygen (O), selenium (Se), tellurium (Te) or the like).

In the sulfide solid electrolyte of the invention, it is preferable to satisfy a composition represented by formula (1), for example:

$$Li_a PS_b Cl_c \quad (1)$$

wherein, in formula (1), a to c satisfy formulas (A) to (C);

$$5.0 \leq a \leq 6.5 \quad (A)$$

$$6.1 \leq a+c \leq 7.5 \quad (B)$$

$$0.5 \leq a-b \leq 1.5 \quad (C)$$

wherein b>0 and c>1.0 are satisfied.

Formula (A) is preferably in a formula: $5.1 \leq a \leq 6.4$, and more preferably in a formula: $5.2 \leq a \leq 6.3$.

Formula (B) is preferably in a formula: $6.2 \leq a+c \leq 7.4$, and more preferably in a formula: $6.3 \leq a+c \leq 7.3$.

Formula (C) is preferably in a formula: $0.6 \leq a-b \leq 1.3$, and more preferably in a formula: $0.7 \leq a-b \leq 1.3$.

The molar ratio of each element or the composition described above does not mean a molar ratio or a composition in an input raw material used in production, but means a molar ratio or a composition in the sulfide solid electrolyte, which is a product. The molar ratio of each element can be controlled by adjusting the content of each element in the raw material, for example.

It is preferable that the sulfide solid electrolyte of the invention does not have a diffraction peak at 2θ=50.3±0.5 deg in powder X-ray diffraction using CuKα rays, or, if the sulfide solid electrolyte has a diffraction peak, said diffraction peak satisfies formula (2):

$$0 < I_A/I_B < 0.05 \quad (2)$$

wherein $I_A$ represents intensity of a diffraction peak at 2θ=50.3±0.5 deg, and $I_B$ represents intensity of a diffraction peak at 2θ=25.5±0.5 deg.

Formula (2) indicates that an amount of LiCl is relatively smaller in comparison with the argyrodite-type crystal structure. Presence of LiCl means that an excessive amount of chlorine is present in the solid electrolyte due to a case where a content of chlorine in the raw material is high. Formula (2) is more preferably in a formula: $0 < I_A/I_B < 0.04$, and further preferably in a formula: $0 < I_A/I_B < 0.03$.

Further, it is preferable that the sulfide solid electrolyte of the invention does not have a diffraction peak at 2θ=17.6±0.4 deg and 2θ=18.1±0.4 deg (not the diffraction peak arising from the argyrodite-type crystal structure) in the powder X-ray diffraction using CuKα rays, or, if the sulfide solid electrolyte has a diffraction peak, said diffraction peak satisfies formula (3):

$$0 < I_C/I_D < 0.05 \quad (3)$$

wherein $I_C$ represents intensity of a diffraction peak which is not the diffraction peak of the argyrodite-type crystal structure between the diffraction peaks at 2θ=17.6±0.4 deg and b 2θ=18.1±0.4 deg, and $I_D$ represents intensity of a diffraction peak at 2θ=30.0±0.5 deg.

The crystal structure specified by $I_C$ (hereinafter, referred to as a $Li_3PS_4$ crystal structure) has low ion conductivity, and therefore, reduces the ion conductivity of the solid electrolyte. Formula (3) indicates that an amount of the $Li_3PS_4$ crystal structure is relatively smaller in comparison with the argyrodite-type crystal structure. Formula (3) is more preferably in a formula: $0 < I_C/I_D < 0.03$, and further, preferably in a formula: $0 < I_C/I_D < 0.02$.

In addition, either 2θ=17.6±0.4 deg or 2θ=18.1±0.4 deg ordinarily overlaps with the diffraction peak of the argyrodite-type crystal structure in which intensity of the peak is relatively strong, and therefore, the peak at 2θ=17.6±0.4 deg or 2θ=18.1±0.4 deg cannot be measured in several cases. Accordingly, an expression "the diffraction peak which is not the diffraction peak of the argyrodite-type crystal structure between the diffraction peaks at 2θ=17.6±0.4 deg and 2θ=18.1±0.4 deg" ordinarily means a peak having lower intensity between these two peaks observed. In addition, a background or noise of a measured intensity S/N ratio is observed as the peak in several cases. In such a case, even if such a background or noise is assumed as $I_D$, formula (3) is obviously satisfied.

Further, it is preferable that the sulfide solid electrolyte of the invention does not have a diffraction peak other than the diffraction peak of the argyrodite-type crystal structure in the powder X-ray diffraction using CuKα rays, or, if the sulfide solid electrolyte has a diffraction peak, said diffraction peak satisfies the following formula:

$$0 < I_E/I_D < 0.1$$

wherein $I_E$ represents intensity of a diffraction peak other than the diffraction peak of the argyrodite-type crystal structure, and $I_D$ represents intensity of a diffraction peak at 2θ=30.0±0.5 deg.

The above-described formula is more preferably in a formula: $0 < I_E/I_D < 0.05$, and further preferably in a formula: $0 < I_E/I_D < 0.03$.

Examples of the diffraction peak of the argyrodite-type crystal structure include diffraction peaks at 2θ=15.6±0.5 deg, 18.0±0.5 deg, 2θ=25.5±0.5 deg, 30.0±0.5 deg, 31.4±0.5 deg, 45.0±0.5 deg and 47.9±0.5 deg, but not limited thereto. Examples thereof also include a peak recognized as the diffraction peak of the argyrodite-type crystal structure in structural information on inorganic crystal structure database (ICSD).

The sulfide solid electrolyte of this embodiment can be prepared according to a production method having a step of applying mechanical stress to a mixture of the raw materials as described later to cause reaction to prepare an intermediate and a step of applying heat treatment to the intermediate to cause crystallization.

As the raw materials to be used, two or more of compounds containing the elements to be contained in the sulfide solid electrolyte to be produced as essential elements, namely, lithium, phosphorus, sulfur, and chlorine as a whole are used, or elementary substances are combined and used.

Examples of the raw material containing lithium include a lithium compound such as lithium sulfide ($Li_2S$), lithium oxide ($Li_2O$), and lithium carbonate ($Li_2CO_3$); and an elemental lithium metal. Above all, a lithium compound is preferable, and lithium sulfide is more preferable.

The lithium sulfide described above can be used without particular limitation, but a material having high purity is preferable. Lithium sulfide can be produced by the method described in JP-A-H07-330312, JP-A-H09-283156, JP-A-2010-163356 or JP-A-2011-84438, for example.

Specifically, the lithium sulfide can be synthesized by reacting hydrogen sulfide and lithium hydroxide at 70° C. to 300° C. in a hydrocarbon-based organic solvent to form lithium hydrosulfide, and subsequently removing hydrogen sulfide from this reaction liquid (JP-A-2010-163356).

Further, the lithium sulfide can be synthesized by reacting hydrogen sulfide and lithium hydroxide at 10° C. to 100° C. in an aqueous solvent to form lithium hydrosulfide, and subsequently removing hydrogen sulfide from this reaction liquid (JP-A-2011-84438).

Examples of the raw material containing phosphorus include a phosphorus compound such as phosphorus sulfide including phosphorus trisulfide ($P_2S_3$) and phosphorus pentasulfide ($P_2S_5$), and sodium phosphate ($Na_3PO_4$), and a phosphorus elementary substance. Above all, phosphorus sulfide is preferable, and phosphorus pentasulfide ($P_2S_5$) is more preferable. The phosphorus compound such as phosphorus pentasulfide ($P_2S_5$) or the phosphorus elementary substance can be used without particular limitation, as long as such a material is industrially produced and commercially available.

As the raw material containing chlorine, a chlorine compound represented by formula (4) is preferable, for example.

$$M_l\text{-}Cl_m \quad (4)$$

In formula (4), M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi) or materials in which an oxygen element or a sulfur element is bonded to these elements, and lithium (Li) or phosphorus (P) is preferable, and lithium (Li) is more preferable.

Then, l is an integer of 1 or 2 and m is an integer of 1 to 10.

Specific examples of the chlorine compound include NaCl, LiCl, $BCl_3$, $AlCl_3$, $SiCl_4$, $SiCl_3$, $Si_2Cl_6$, $SiBrCl_3$, $SiBr_2Cl_2$, $PCl_3$, $PCl_5$, $POCl_3$, $P_2Cl_4$, $SCl_2$, $S_2Cl_2$, $GeCl_4$, $GeCl_2$, $AsCl_3$, $SeCl_2$, $SeCl_4$, $SnCl_4$, $SnCl_2$, $SbCl_3$, $SbCl_5$, $TeCl_2$, $TeCl_4$, $PbCl_4$, $PbCl_2$ and $BiCl_3$.

Above all, lithium chloride (LiCl), phosphorus pentachloride ($PCl_5$), or phosphorus trichloride ($PCl_3$) is preferable.

As the chlorine compound, one of the above-described compounds may be used alone, or two or more may be combined and used. That is, at least one of the above-described compounds can be used.

In the invention, the raw material preferably contains a lithium compound, a phosphorus compound and a chlorine compound, and at least one of the lithium compound and the phosphorus compound preferably contains a sulfur element. The raw material more preferably contains a combination of lithium sulfide, phosphorus sulfide and lithium chloride, and further preferably a combination of lithium sulfide, phosphorus pentasulfide and lithium chloride.

For example, when lithium sulfide, phosphorus pentasulfide and lithium chloride are used as the raw materials of the sulfide solid electrolyte of the invention, a molar ratio of the input raw materials can be adjusted to a ratio lithium sulfide:phosphorus pentasulfide:lithium chloride=40 to 60:10 to 20:25 to 50.

In this embodiment, the mechanical stress is applied to the above-described raw materials to cause reaction to prepare the intermediate. Here, an expression "the mechanical stress is applied" means that shear force, impact force or the like is mechanically applied thereto. Examples of a means for applying the mechanical stress can include a pulverizer such as a planetary ball mill, a vibrating mill and a rolling mill, and a kneader.

In the conventional technology (for example, Patent Literature 2), the raw materials are pulverized and mixed to such an extent that crystallinity of raw material powder can be maintained. On the other hand, in this embodiment, it is preferable that the mechanical stress is applied to the raw materials to cause reaction to prepare the intermediate containing a glass component. That is, the raw materials are pulverized and mixed by the mechanical stress higher than the stress according to the conventional technology into a state in which at least part of the raw material powder cannot maintain the crystallinity. Consequently, a $PS_4$ structure that is a basic skeleton of the argyrodite-type crystal structure can be formed and the halogen can be highly dispersed in a stage of the intermediate. As a result, the halogen is easily incorporated into the argyrodite-type crystal structure upon being formed into the argyrodite-type crystal structure that is a stable phase at the time of heat treatment in a next step. Further, it is assumed that a low ion conductivity phase such as a $Li_3PS_4$ crystal structure is hard to be formed because phases of each region are not different. Consequently, it is estimated that the sulfide solid electrolyte of the invention exhibits high ion conductivity.

In addition, it can be confirmed that the intermediate contains the glass (amorphous) component by presence of a broad peak (hallo pattern) arising from the amorphous component in an XRD measurement.

Further, in the sulfide solid electrolyte of this embodiment, it is unnecessary to heat the raw materials for 6 days at 550° C. as in the Patent Literature 1, and therefore mass productivity is high.

When the sulfide solid electrolyte including the argyrodite-type crystal structure is produced directly from the raw material without passing through the intermediate containing the glass component, it is difficult to obtain the sulfide solid electrolyte having high ion conductivity. The reason is that the halogen easily stays in the stable phase, and when the sulfide solid electrolyte is produced directly from the raw material, the halogen is incorporated into any other stable phase or agglomeration or re-agglomeration is caused without being dispersed during a period in which the argyrodite-type crystal structure is formed in the sulfide solid electrolyte.

The halogen can smoothly enter into sites of the argyrodite-type crystal structure during heat treatment of the intermediate containing the glass component by producing the intermediate containing the glass component to mix raw material components at an atomic level.

As conditions of pulverization and mixing the raw materials, for example, when the planetary ball mill is used as the pulverizer, a revolution speed only needs to be adjusted to several tens to several hundreds of revolutions per minute and the raw materials only need to be treated for 0.5 hour to 100 hours. More specifically, in the case of the planetary ball mill (model No. P-7, manufactured by Fritsch Co.) used in Examples of the present application, the number of revolutions of the planetary ball mill is preferably 350 rpm or more and 400 rpm or less, more preferably 360 rpm or more and 380 rpm or less.

With regard to a ball, which is pulverization media, for example, when a zirconia ball is used, a diameter thereof is preferably 0.2 to 20 mm.

The intermediate prepared by pulverizing and mixing the raw materials is heat-treated. A heat treatment temperature is preferably 350 to 650° C., more preferably 360 to 500° C., and further preferably 380 to 450° C. The chlorine included in the argyrodite-type crystal structure tends to increase by adjusting the heat treatment temperature to a slightly lower level as compared with conventional technologies.

An atmosphere of the heat treatment is not particularly limited, but is preferably under an atmosphere of inert gas such as nitrogen and argon, and not under a hydrogen sulfide stream. It is estimated that the amount of chlorine in the crystal structure can be increased by suppressing a free chlorine in the crystal structure from being substituted for sulfur, and as a result, the ion conductivity of the obtained sulfide solid electrolyte is improved.

In order to increase the amount of chlorine included in the argyrodite-type crystal structure, it is considered to increase the content of chlorine In the raw material, for example. However, the amount of chlorine present in any other part of the sulfide solid electrolyte, and the amount of chlorine remaining in a state of the raw material (for example, lithium chloride) also increase, and therefore performance of the sulfide solid electrolyte is reduced In several cases.

In addition to a method of increasing the content of chlorine in the raw material, for example, as described above, it is effective to sufficiently pulverize and mix the raw materials, to adjust the atmosphere of heat treatment (baking) or to adjust the heat treatment temperature. An increase in the amount of chlorine present in a part other than the argyrodite-type crystal structure in the sulfide solid electrolyte can be suppressed to efficiently increase the amount of chlorine included in the argyrodite-type crystal structure by adjusting these conditions.

In the invention, the sulfide solid electrolyte in which the amount of chlorine included in the argyrodite-type crystal structure is larger than ever before can be obtained by adjusting the conditions of producing the sulfide solid electrolyte.

For example, in the invention, when the molar ratio "c" is 1.2 or more and 1.4 or less, the lattice constant can be adjusted to 9.815 Å or more and 9.820 Å or less. Further, when the molar ratio "c" is greater than 1.4 and 1.8 or less, the lattice constant can be adjusted to 9.800 Å or more and 9.810 Å or less.

The sulfide solid electrolyte of the invention can be used in a solid electrolyte layer, a positive electrode, a negative electrode, or the like of a lithium ion secondary battery or the like.

[Electrode Mix]

An electrode mix according to one embodiment of the invention contains the sulfide solid electrolyte of the invention described above and an active material, or is produced from the sulfide solid electrolyte of the invention. If a negative electrode active material is used as the active material, the electrode mix is formed into a negative electrode mix. On the other hand, if a positive electrode active material is used, the electrode mix is formed into a positive electrode mix.

*Negative Electrode Mix

The negative electrode mix is obtained by blending the negative electrode active material in the sulfide solid electrolyte of the invention.

As the negative electrode active material, for example, a carbon material, a metallic material, or the like can be used. A composite formed of two or more of these can also be used. Further, a negative electrode active material that will be developed in the future can also be used.

Further, the negative active material preferably has electron conductivity.

Examples of the carbon material include graphite (artificial graphite, for example), a graphite carbon fiber, resin baked carbon, pyrolytic vapor grown carbon, coke, mesocarbon microbeads (MCMB), furfuryl alcohol baked resin carbon, polyacene, a pitch type carbon fiber, a vapor grown carbon fiber, natural graphite and nongraphitizing carbon.

Examples of the metallic material include an elemental metal, an alloy, and a metal compound. Examples of the elemental metal include metal silicon, metal tin, metal lithium, metal indium and metal aluminum. Examples of the alloy include an alloy containing at least one of silicon, tin, lithium, Indium and aluminum. Examples of the metal compound include metal oxide. Examples of the metal oxide include silicon oxide, tin oxide and aluminum oxide.

A blending ratio of the negative electrode active material and the solid electrolyte is preferably the negative electrode active material: the solid electrolyte=95 wt %: 5 wt % to 5 wt %: 95 wt %, more preferably 90 wt %: 10 wt % to 10 wt %: 90 wt %, and further preferably 85 wt %: 15 wt % to 15 wt %: 85 wt %.

If a content of the negative electrode active material in the negative electrode mix is excessively small, electric capacity becomes small. Further, when the negative electrode active material has the electron conductivity and does not contain a conductive additive or contains only a small amount of the conductive additive, it is considered that electron conductivity (electron conduction path) in the negative electrode is liable to be reduced to cause reduction of rate property, or a utilization factor of the negative electrode active material is liable to be reduced to cause reduction of the electric capacity. On the other hand, if the content of the negative electrode active material in the negative electrode mix is excessively large, it is considered that the ion conductivity (ion conduction path) in the negative electrode is liable to be reduced to cause reduction of the rate property, or the utilization factor of the negative electrode active material is liable to be reduced to cause reduction of the electric capacity.

The negative electrode mix can further contain the conductive additive.

When the electron conductivity of the negative electrode active material is low, it is preferable to add the conductive additive. The conductive additive only needs to have conductivity, and the electron conductivity is preferably $1\times10^3$ S/cm or more, and more preferably $1\times10$ S/cm or more.

Specific examples of the conductive additive preferably include a carbon material, and a material containing at least one element selected from the group consisting of nickel, copper, aluminum, indium, silver, cobalt, magnesium, lithium, chromium, gold, ruthenium, platinum, beryllium, iridium, molybdenum, niobium, osmium, rhodium, tungsten and zinc, and more preferably include a carbon elementary substance having high conductivity, a carbon material other than the carbon elementary substance; and an elemental metal including nickel, copper, silver, cobalt, magnesium, lithium, ruthenium, gold, platinum, niobium, osmium or rhodium, a mixture thereof or a compound thereof.

In addition, specific examples of the carbon material include carbon black such as Ketjenblack, acetylene black, denka black, thermal black, and channel black; graphite, a carbon fiber, and activated carbon, and the materials may be used alone or in combination of two or more. Above all, acetylene black, denka black, or Ketjenblack, each having high electron conductivity, is preferable.

A content of the conductive additive in the mixture when the negative electrode mix contains the conductive additive is preferably 1 to 40 mass %, and more preferably 2 to 20 mass %. If the content of the conductive additive is excessively small, it is considered that the electron conductivity of the negative electrode is liable to be reduced to cause reduction of the rate property, or the utilization factor of the negative electrode active material is liable to be reduced to cause reduction of the electric capacity. On the other hand, if the content of the conductive additive is excessively large, an amount of the negative electrode active material and/or an amount of the solid electrolyte becomes small. It is estimated that, if the amount of the negative electrode active material becomes small, the electric capacity is reduced. Further, it is considered that, if the amount of the solid electrolyte becomes small, the ion conductivity of the negative electrode is liable to be reduced to cause reduction of the rate property, or the utilization factor of the negative electrode active material is liable to be reduced to cause reduction of the electric capacity.

The solid electrolyte may further contain a binder in order to tightly bind the negative electrode active material and the solid electrolyte with each other.

As the binder, a fluorine-containing resin such as polytetrafluoroethylene (PTFE), polyvinylidene fluoride (PVDF) and fluorocarbon rubber, a thermoplastic resin such as polypropylene and polyethylene, ethylene-propylene-diene rubber (EPDM), sulfonated EPDM, natural butyl rubber (NBR) or the like can be used alone or as a mixture of two or more. Further, a cellulose-based aqueous dispersion, an aqueous dispersion of styrene-butadiene rubber (SBR), or the like, which is an aqueous binder, can also be used.

The negative electrode mix can be produced by mixing the solid electrolyte and the negative electrode active material, and an arbitrary conductive additive and/or an arbitrary binder.

A mixing method is not particularly limited, but such a method can be applied thereto, for example, as dry mixing by mixing the materials by using a mortar, a ball mill, a bead mill, a jet mill, a planetary ball mill, a vibrating ball mill, a sand mill, and a cutter mill; and wet mixing in which, after the raw materials are dispersed into an organic solvent, the resultant material is mixed by using a mortar, a ball mill, a bead mill, a planetary ball mill, a vibrating ball mill, a sand mill, and a film mix, and then the solvent is removed. Above all, wet mixing is preferable because negative electrode active material particles are not destroyed.

*Positive Electrode Mix

The positive electrode mix can be obtained by blending the positive electrode active material in the solid electrolyte of the invention.

The positive electrode active material is a material capable of inserting or eliminating a lithium ion into or from the material, and a publicly-known material as the positive electrode active material in the field of a battery can be used. Further, a positive electrode active material that will be developed in the future can also be used.

Examples of the positive electrode active material include metal oxide and sulfide. The sulfide includes metal sulfide and nonmetal sulfide.

The metal oxide is transition metal oxide, for example. Specific examples include $V_2O_5$, $V_6O_{13}$, LiCoO$_2$, LiNiO$_2$, LiMnO$_2$, LiMn$_2$O$_4$, Li(Ni$_a$Co$_b$Mn$_c$)O$_2$ (in which, $0<a<1$, $0<b<1$, $0<c<1$, $a+b+c=1$), LiNi$_{1-y}$Co$_y$O$_2$, LiCo$_{1-y}$MnO$_2$, LiNi$_{1-y}$Mn$_y$O$_2$ (in which, $0\leq Y<1$), Li(Ni$_a$Co$_b$Mn$_c$)O$_4$ ($0<a<2$, $0<b<2$, $0<c<2$, $a+b+c=2$), LiMn$_{2-z}$Ni$_z$O$_4$, LiMn$_{2-z}$Co$_z$O$_4$ (in which, $0<Z<2$), LiCoPO$_4$, LiFePO$_4$, CuO and Li(Ni$_a$Co$_b$Al$_c$)O$_2$ (in which, $0<a<1$, $0<b<1$, $0<c<1$, $a+b+c=1$).

Examples of the metal sulfide include titanium sulfide (TiS$_2$), molybdenum sulfide (MoS$_2$), iron sulfide (FeS, FeS$_2$), copper sulfide (CuS) and nickel sulfide (Ni$_3$S$_2$).

In addition thereto, examples of the metal oxide include bismuth oxide (Bi$_2$O$_3$) and bismuth-lead oxide (Bi$_2$Pb$_2$O$_5$).

Examples of the nonmetal sulfide include an organic disulfide compound and a carbon sulfide compound.

In addition to the materials described above, niobium selenide (NbSe$_3$), metal indium, or sulfur can also be used as the positive electrode active material.

The positive electrode mix may further contain the conductive additive.

The conductive additive is the same as in the negative electrode mix.

A blending ratio of the solid electrode and the positive electrode active material of the positive electrode mix, a content of the conductive additive and a method for producing the positive electrode mix are the same as in the negative electrode mix described above.

[Lithium Ion Battery]

The lithium ion battery according to one embodiment of the invention includes at least one of the sulfide solid electrolyte and the electrode mix of the invention described above, or is produced from at least one of the sulfide solid electrolyte and the electrode mix of the invention.

A configuration of the lithium ion battery is not particularly limited, but generally has a structure in which a negative electrode layer, an electrolyte layer and a positive electrode layer are stacked in this order. Hereinafter, each layer of the lithium ion battery will be described.

(1) Negative Electrode Layer

The negative electrode layer is preferably a layer produced from the negative electrode mix of the invention.

Alternatively, the negative electrode layer is a layer including the negative electrode mix of the invention.

A thickness of the negative electrode layer is preferably 100 nm or more and 5 mm or less, more preferably 1 μm or more and 3 mm or less, and further preferably 5 μm or more and 1 mm or less.

The negative electrode layer can be produced by a publicly-known method, for example, by a coating method or an electrostatic method (an electrostatic spray method, an electrostatic screen method, or the like).

(2) Electrolyte Layer

The electrolyte layer is a layer including the solid electrolyte or a layer produced from the solid electrolyte. The solid electrolyte is not particularly limited, but is preferably the sulfide solid electrolyte according to the invention.

The electrolyte layer may consist essentially of the solid electrolyte, or may further include a binder. As the binder, the same binder as the binder in the negative electrode mix of the invention can be used.

A thickness of the electrolyte layer is preferably 0.001 mm or more and 1 mm or less.

The solid electrolyte of the electrolyte layer may be fused. A term "fused" means that part of solid electrolyte particles is melted and a melted part is integrated with other solid electrolyte particles. Further, the electrolyte layer may be formed in a plate-like body of the solid electrolyte, in which the plate-like body includes a case where the solid electrolyte particles are partly or wholly melted into the plate-like body.

The electrolyte layer can be produced by a publicly-known method, for example, by a coating method or an electrostatic method (an electrostatic spray method, an electrostatic screen method, or the like).

(3) Positive Electrode Layer

The positive electrode layer is a layer including the positive electrode active material, and preferably a layer including the positive electrode mix of the invention or a layer produced from the positive electrode mix of the invention.

A thickness of the positive electrode layer is preferably 0.01 mm or more and 10 mm or less.

The positive electrode layer can be produced by a publicly-known method, for example, by a coating method or an electrostatic method (an electrostatic spray method, an electrostatic screen method, or the like).

(4) Current Collector

The lithium ion battery of this embodiment preferably further includes a current collector. For example, a negative electrode current collector is provided on a side opposite to a side of the electrolyte layer of the negative electrode layer, and a positive electrode current collector is provided on a side opposite to the side of the electrolyte layer of the positive electrode layer.

As the current collector, a plate-like body or a foil-like body, or the like formed of copper, magnesium, stainless steel, titanium, iron, cobalt, nickel, zinc, aluminum, germanium, indium, lithium or an alloy thereof, or the like can be used.

The lithium ion battery of this embodiment can be produced by laminating and bonding the respective members described above. Examples of a method for bonding the members include a method in which the respective members are stacked, pressurized and pressure-bonded, and a method in which the members are pressurized by passing through two rolls (a roll-to-roll method).

Further, the members may be bonded through an active material having ion conductivity or an adhesive substance that does not adversely affect the ion conductivity on a bonding surface.

In the bonding, the members may be heated and fused within the range in which the crystal structure of the solid electrolyte is not changed.

Further, the lithium ion battery of this embodiment can also be produced by sequentially forming the respective members described above. The lithium ion battery can be produced by a publicly-known method, for example, by a coating method, an electrostatic method (an electrostatic spray method, an electrostatic screen method, or the like).

EXAMPLES

Hereinafter, the invention will be described in more detail by Examples.

In addition, an evaluation method is as follows.

(1) Ion Conductivity and Electron Conductivity Measurement

A sulfide solid electrolyte produced in each example was filled in tableting machinery and a pressure of 407 MPa (press indicated value: 22 MPa) was applied by using a mini press machine, and the resultant material was taken as a molded body. As an electrode, carbon was placed on both surfaces of the molded body, and pressure was applied again by the tableting machinery to prepare a molded body for measurement (diameter: about 10 mm, thickness: 0.1 to 0.2 cm). Ion conductivity was measured on this molded body by AC impedance measurement. As a value of the ion conductivity, a numerical value at 25° C. was adopted.

In addition, in the method for measuring the ion conductivity used in this Example, in a case where the ion conductivity is less than $1.0 \times 10^{-6}$ S/cm, the ion conductivity was unable to be accurately measured, and therefore such a case was deemed as unmeasurable.

Further, electron conductivity was measured on this molded body by DC electricity measurement. As a value of the electron conductivity, a numerical value at 25° C. was adopted. In addition, when the electron conductivity upon applying a voltage of 5 V was less than $1.0 \times 10^{-6}$ S/cm, the electron conductivity was deemed as unmeasurable.

(2) X-Ray Diffraction (XRD) Measurement

A circular pellet having a diameter of 10 mm and a height of 0.1 to 0.3 cm was molded from powder of the sulfide solid electrolyte produced in each example, and the resultant molded body was applied as a sample. This sample was measured using an air-tight holder for XRD by avoiding contacting with air. A position of a diffraction peak at 2θ was determined by a centroid method using an XRD analysis program JADE.

Measurement was conducted using Powder X-ray Diffractometer SmartLab manufactured by Rigaku Corporation under the following conditions. In addition, an angle of the diffractometer was calibrated by using a standard sample of Si powder before sample measurement.

Tube voltage: 45 kV
Tube current: 200 mA
X-ray wavelength: Cu-Kα rays (1.5418 Å)
Optical system: parallel beam system
Slit configuration: solar slit 5°, incident slit: 1 mm, light receiving slit: 1 mm Detector scintillation counter
Measurement range: 2θ=10 to 60 deg
Step width, scan speed: 0.02 deg, 1 deg/min In an analysis of a peak position for confirming presence of a crystal structure from the measurement results, the peak position was determined by drawing a baseline by cubic approximation using the XRD analysis program JADE.

In intensity of the peak, a ratio of intensity was calculated by analyzing intensity of one peak of an argyrodite-type crystal structure existing at 2θ=30.0 deg±0.5 deg and intensity of two peaks of a $Li_3PS_4$ crystal structure existing at 2θ=17.6±0.4 deg and 18.1±0.4 deg according to the following procedure.

Smoothing was conducted by a moving average of 5 points of measured data, and a lowest intensity point between 17.5 to 18.5 deg was taken as a background and subtracted from the measured data. Then, a maximum value of measured data between maximum values of measured data at 17.0 to 17.8 deg and 17.9 to 18.5 deg was calculated, and intensity of a smaller peak was used as intensity of the peak of the $Li_3PS_4$ crystal structure. Further, intensity of the peak of the argyrodite-type crystal structure was calculated by applying a maximum value of measured data in the region of 29.0 to 32.0 deg as the intensity of the peak.

(3) ICP Measurement

Powder of the sulfide solid electrolyte produced in each example was weighed and collected in a vial bottle in an argon atmosphere. A KOH alkaline aqueous solution was put in the vial bottle, and the sample was dissolved while paying attention to no capturing of a sulfur content, and appropriately diluted, and the resultant material was applied as a measurement solution. This solution was measured with a Paschen Runge-type ICP-OES system (SPECTRO ARCOS, manufactured by SPECTRO), and a composition was determined.

Solutions for calibration curve were prepared by using a 1000 mg/L standard solution for ICP measurement for Li, P, and S, and a 1000 mg/L standard solution for ion chromatography for Cl.

Two measurement solutions were prepared in each sample, five-time measurements were conducted using each measurement solution, and an average value was calculated. The composition was determined by an average of measured values of the two measurement solutions.

(4) Lattice Constant of Argyrodite-Type Crystal Structure

XRD measurement was conducted under the same conditions as the measurement described in (2) above. A lattice constant of each component was calculated by conducting a whole pattern fitting (WPF) analysis on the thus obtained XRD pattern by using crystal structure analysis software JADE ver. 6 manufactured by MDI, and specifying each crystal component included in the XRD pattern.

*Removal of Background of XRD Pattern

In the XRD pattern after the measurement, a signal arising from a sealed cell made of polymethyl methacrylate (PMMA) is present on a low angle side. In order to remove such a signal, a baseline attenuated from the low angle side was calculated by three-dimensional approximation according to the XRD pattern.

*Identification of Peak Components

A peak component was identified on each component contained in the sample by superposing, on the XRD pattern, a pattern calculated from structural information on inorganic crystal structure database (ICSD). The structural information used is shown in Table 1.

TABLE 1

| Component | ICSD | Crystal system | Lattice constant (Å) |
|---|---|---|---|
| Lithium sulfide | #657596 | Cubic system Fm-3m (225) | a = 5.723 |
| Lithium chloride | #418525 | Cubic system Fm-3m (225) | a = 5.146 |
| Argyrodite (with Cl) | #418490 | Cubic system F-43m (216) | a = 9.859 |
| Argyrodite (without Cl) | #421130 | Cubic system F-43m (216) | a = 9.9926 |

*WPF Analysis

Main parameter settings for a WPF analysis are shown below.

X-ray wavelength: CuKα rays (λ=1.54184 Å)

Fitting parameter: A peak shape was approximated as a symmetrical peak. A temperature factor was excluded from a fitting. When a crystal phase of $Li_2S$ or the like remained as a fine peak, the fitting is not converged in several cases. In such a case, the lattice constant of the argyrodite type crystal was calculated by performing the fitting by excluding a structure other than an argyrodite phase and a lithium chloride phase from a fitting object, and manually inputting a half width and intensity.

With regard to the lattice constant, it was confirmed whether or not a peak position of the crystal structure to be evaluated was in good agreement with the fitting results. With regard to an area ratio, an R value falling within the range of 10% or less was applied as a measure of validity of the results. The R value serving as the measure of accuracy of the fitting becomes high in several cases when the number of unknown peaks is large or an amorphous peak remains.

(5) Solid $^{31}$P-NMR Measurement

About 60 mg of a powder sample was filled in an NMR sample tube, and a solid $^{31}$P-NMR spectrum was obtained under the following apparatus and conditions.

Apparatus: ECZ 400 R spectrometer (manufactured by JEOL Ltd.)
Observation nucleus: $^{31}$P
Observation frequency: 161.944 MHz
Measurement temperature: room temperature
Pulse sequence: single pulse (using 90° pulse)
90° pulse width: 3.8 μm
Waiting time for next pulse application after FID measurement: 300 s
Number of revolutions for magic angle revolution: 12 kHz
Accumulation: 16 times
Measurement range: 250 ppm to −150 ppm In the solid $^{31}$P-NMR spectrum measurement, chemical shifts were obtained by using $(NH_4)_2HPO_4$ (chemical shift: 1.33 ppm) as an external reference.

NMR signals in the region of 78 to 92 ppm of the solid $^{31}$P-NMR spectrum were separated, by a nonlinear least-squares method, into each peak having a Gauss function or Pseudo-Voigt function (linear sum of the Gauss function and a Lorentz function). In the above-described range, in addition to peaks arising from the argyrodite-type crystal structure including chlorine, a peak arising from $Li_7PS_6$ is observed in 88.5 to 90.5 ppm, or a peak arising from A crystals of $Li_3PS_4$ is observed in 86 to 87.6 ppm in an overlapped manner in several cases. Accordingly, waveform separation was performed by different techniques depending on a case where these two peaks are not observed and a case where these two peaks are observed.

(1) Case where Peaks Arising from $Li_7PS_6$ and β Crystals of $Li_3PS_4$ are not Observed The NMR signals in the region of 78 to 92 ppm were separated, by the nonlinear least-squares method, into each peak of three peaks in positions and ranges of half widths, each having the Gaussian function or Pseudo-Voigt function (linear sum of the Gaussian function and the Lorentz function), as shown in Table 2. An area ratio (%) of each peak was calculated from respective areas $S_1$ to $S_3$ of peaks A to C as obtained and a total $S_{all}$ (=$S_1$+$S_2$+$S_a$) thereof.

TABLE 2

| | Chemical shift (ppm) | Half width (Hz) | Function used for separation | Area |
|---|---|---|---|---|
| Third peak ($P_3$) | 84.0 to 85.6 | 150 to 800 | Pseudo-Voigt | $S_3$ |
| Second peak ($P_2$) | 82.4 to 83.7 | 150 to 800 | Gauss | $S_2$ |
| First peak ($P_1$) | 80.3 to 81.7 | 150 to 500 | Pseudo-Voigt | $S_1$ |

(2) Case where a Peak Arising from $Li_7PS_6$ or β Crystals of $Li_3PS_4$ is Observed As shown in Table 3, the three peaks arising from the argyrodite-type crystal structure including chlorine, and additionally a peak arising from $Li_7PS_6$ (peak I) or $Li_3PS_4$ (peak II) were used, and the NMR signals in the region of 78 to 92 ppm were separated by using the nonlinear least-squares method. An area ratio (%) of each peak was calculated from areas $S_1$ to $S_5$ of peaks A to C, and areas $b_1$ and $b_2$ of the peaks I and II as obtained, and a total $S_{all+b}$ (=$S_1$+$S_2$+$S_3$+$b_1$+$b_2$) thereof.

TABLE 3

| | Chemical shift (ppm) | Half width (Hz) | Function used for separation | Area |
|---|---|---|---|---|
| Third peak ($P_3$) | 84.0 to 85.6 | 150 to 800 | Pseudo-Voigt | $S_3$ |
| Second peak ($P_2$) | 82.4 to 83.7 | 150 to 800 | Gauss | $S_2$ |
| First peak ($P_1$) | 80.3 to 81.7 | 150 to 500 | Pseudo-Voigt | $S_1$ |
| Peak I | 88.5 to 90.5 | 150 to 800 | Pseudo-Voigt | $b_1$ |
| Peak II | 86.0 to 87.6 | 150 to 500 | Pseudo-Voigt | $b_2$ |

Production Example 1

(Production of Lithium Sulfide ($Li_2S$))

In a 500 mL separable flask equipped with a stirrer, 200 g of dried LiOH anhydrous (manufactured by Honjo Chemical Co., Ltd.) was put under an inert gas. Temperature was raised under a nitrogen stream, and internal temperature was held at 200° C. A nitrogen gas was switched to a hydrogen sulfide gas (SUMITOMO SEIKA CHEMICALS CO., LTD.), and a flow rate was adjusted to 500 mL/min to react LIOH anhydrous and hydrogen sulfide.

Moisture generated by the reaction was condensed by a condenser and collected. At a time-point of performing the reaction for 6 hours, 144 mL of water was collected. The reaction was further continued for 3 hours, but no water generation was observed.

Product powder was collected and purity and XRD were measured. As a result, the purity was 98.5%, and in XRD, a peak pattern of $Li_2S$ was able to be confirmed in XRD.

Example 1

The lithium sulfide (purity: 98.5%) produced in Production Example 1, phosphorus pentasulfide (manufactured by Thermophos International, purity: 99.9% or more) and lithium chloride (manufactured by Sigma-Aldrich Co. LLC; purity: 99%) were used as starting raw materials (hereinafter, the purity of each starting raw material was the same in all Examples). The respective raw materials were mixed to be 1.9:0.5:1.6 in a molar ratio of lithium sulfide ($Li_2S$), phosphorus pentasulfide ($P_2S_5$) and lithium chloride (LiCl) ($Li_2S$: $P_2S_5$: LiCl). Specifically, 0.492 g of lithium sulfide, 0.626 g of phosphorus pentasulfide and 0.382 g of lithium chloride were mixed, and the resultant mixture was taken as a raw material mixture.

The raw material mixture and 30 g of zirconia balls having a diameter of 10 mm were placed in a zirconia pot (45 mL) of a planetary ball mill (manufactured by Fritsch Co. Ltd., model No. P-7) and completely sealed. An inside of the pot was adjusted to an argon atmosphere. The raw material mixture was treated (mechanical milling) by the planetary ball mill for 72 hours by adjusting the number of revolutions to 370 rpm to obtain glassy powder (intermediate).

About 1.5 g of the above-described intermediate powder was filled in a Tammann tube (PT2, manufactured by Tokyo Glass Instruments Co., Ltd.) in a glove box under an argon atmosphere, and a mouth of the Tammann tube was closed with quartz wool, and the tube was further sealed in a SUS closed container so as to prevent entry of air. Then, the sealed container was placed in an electric furnace (FUW243PA, manufactured by AdvanTech Co., Ltd.) and heat-treated. Specifically, temperature was raised from room temperature to 430° C. at a rate of 2.5*C/min, and held at 430° C. for 8 hours. Then, the powder was gradually cooled to obtain a sulfide solid electrolyte.

Ion conductivity (a) of the sulfide solid electrolyte was 10.6 mS/cm. In addition, electron conductivity was less than 10 S/cm.

An XRD pattern of the sulfide solid electrolyte is shown in FIG. 1. Peaks arising from an argyrodite-type crystal structure were observed at 2θ=15.64, 18.06, 25.66, 30.20, 31.58, 40.04, 41.12, 45.24, 49.16, 52.74, 55.36, 56.22, and 59.56 deg. On the other hand, a peak arising from a $Li_3PS_4$ crystal structure was not observed.

An ICP analysis was conducted on the sulfide solid electrolyte, and a molar ratio of each element was measured. Further, a lattice constant of the argyrodite-type crystal structure included in the sulfide solid electrolyte, an intensity ratio of peaks of LiCl and the $Li_3PS_4$ crystal structure in XRD, and the ion conductivity a were measured. The results are shown in Table 4. Further, an area ratio of each peak in a solid $^{31}$P-NMR spectrum of the sulfide solid electrolyte was measured. The results are shown in Table 5.

Figure 2:
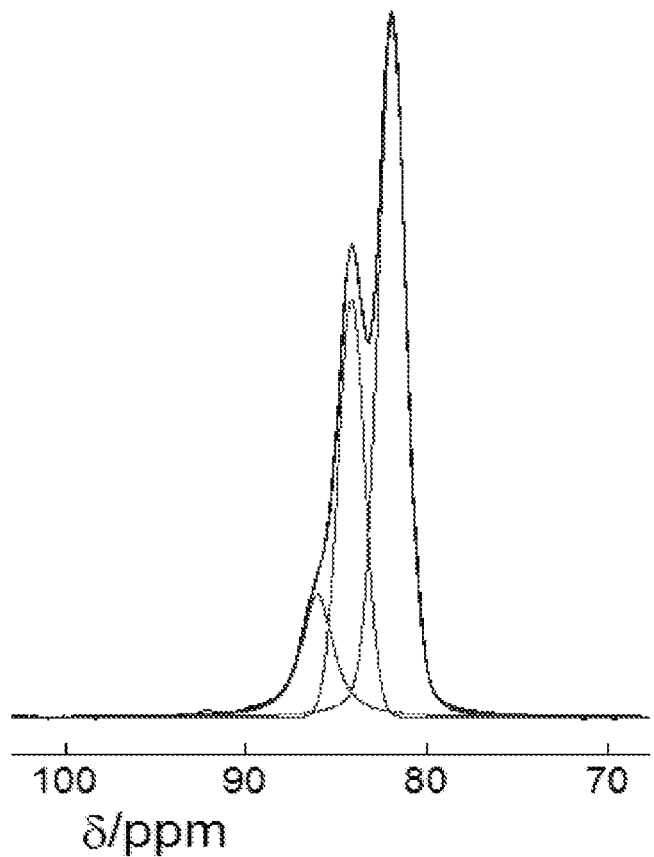
FIG. 2 is a solid $^{31}$P-NMR spectrum of the sulfide solid electrolyte obtained in Example 1.

Further, the solid $^{31}$P-NMR spectrum of the sulfide solid electrolyte obtained in Example 1 is shown in FIG. 2.

TABLE 4

| | Molar ratio of each element to phosphorus | | | | | Lattice constant (Å) | Intensity ratio $(I_A/I_B)$* of LiCl peak | Intensity ratio $(I_C/I_D)$* of $Li_3PS_4$ peak | Ion conductivity (mS/cm) |
|---|---|---|---|---|---|---|---|---|---|
| | a (Li/P) | b (S/P) | c (Cl/P) | a − b | a + c | | | | |
| Ex. 1 | 5.3 | 4.3 | 1.7 | 1.0 | 7.0 | 9.809 | 0.015 | 0 | 10.6 |
| Ex. 2 | 5.3 | 4.3 | 1.7 | 1.0 | 7.0 | 9.810 | 0.022 | 0 | 9.4 |
| Ex. 3 | 5.7 | 4.5 | 1.4 | 1.2 | 7.1 | 9.815 | 0.024 | 0 | 7.3 |
| Ex. 4 | 5.3 | 4.2 | 1.7 | 1.1 | 7.0 | 9.810 | 0.018 | 0 | 8.5 |
| Comp. Ex. 1 | 6.2 | 5.2 | 0.9 | 1.0 | 7.1 | 9.910 | 0.000 | 0 | 3.5 |
| Comp. Ex. 2 | 5.3 | 4.2 | 1.9 | 1.1 | 7.2 | 9.821 | 0.054 | 0.034 | 5.6 |

Abbreviations)
Ex.: Example, Comp. Ex.: Comparative Example. The same shall apply hereinafter.
*$I_A$ is intensity of a diffraction peak at 2θ = 50.3 ± 0.5 deg and $I_B$ is intensity of a diffraction peak at 2θ = 25.5 ± 0.5 deg. $I_C$ is intensity of a diffraction peak which is not a diffraction peak arising from the argyrodite-type crystal structure between diffraction peaks at 2θ = 17.6 ± 0.4 deg and 2θ = 18.1 ± 0.4 deg. $I_D$ is intensity of a diffraction peak at 2θ = 30.0 ± 0.5 deg.

TABLE 5

| | Area ratio of first peak (%) | Area ratio of second peak (%) | Area ratio of third peak (%) | Area ratio of $P_I$ (%) | Area ratio of $P_{II}$ (%) |
|---|---|---|---|---|---|
| Ex. 1 | 54.3 | 26.7 | 19.0 | 0.0 | 0.0 |
| Ex. 2 | 57.2 | 23.3 | 19.5 | 0.0 | 0.0 |
| Ex. 3 | 49.4 | 30.7 | 19.9 | 0.0 | 0.0 |
| Ex. 4 | 56.2 | 27.0 | 16.8 | 0.0 | 0.0 |
| Comp. Ex. 1 | 5.4 | 36.2 | 57.9 | 0.5 | 0.0 |
| Comp. Ex. 2 | 22.4 | 38.1 | 38.8 | 0.0 | 10.7 |

Examples 2 to 4, Comparative Examples 1 and 2

A sulfide solid electrolyte was prepared and evaluated in the same manner as in Example 1 except that raw material compositions and preparation conditions were changed as shown in Table 6. The results are shown in Tables 4 and 5.

In addition, all the sulfide solid electrolytes had electron conductivity less than 106 S/cm.

Figure 3:
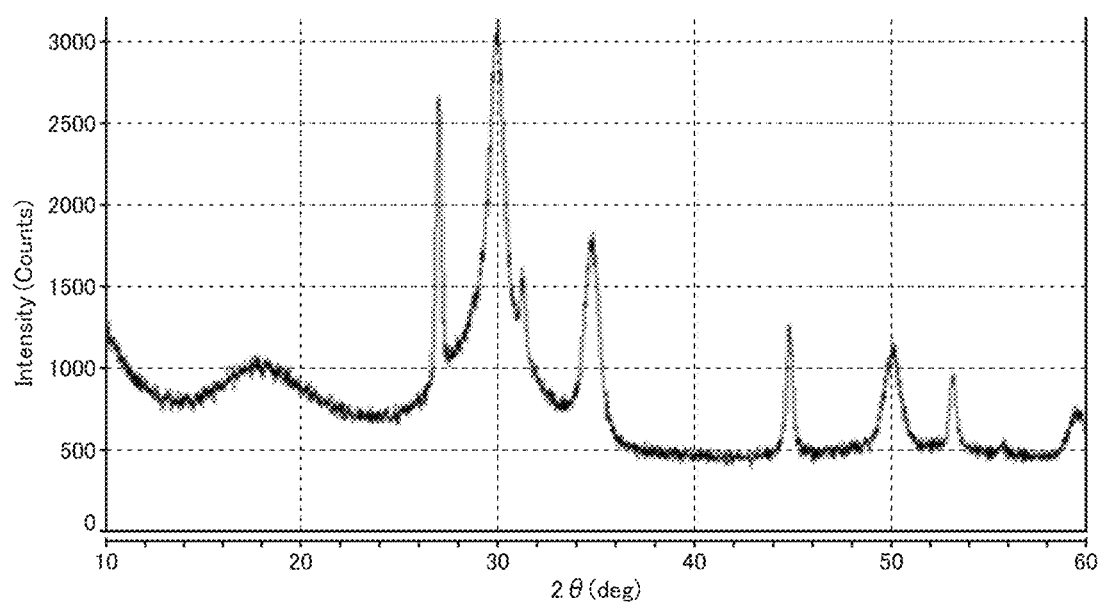
FIG. 3 is an XRD pattern of the intermediate obtained in Example 4.

An XRD pattern of the intermediate obtained in Example 4 is shown in FIG. 3. A hallo pattern indicating that the raw material was vitrified by treatment using the planetary ball mill can be confirmed. While part of the raw material remained, most of the raw material was formed into glass.

TABLE 6

| | Amount of raw materials blended (molar ratio) | | | MM treatment conditions | | Heat treatment conditions | | |
|---|---|---|---|---|---|---|---|---|
| | $Li_2S$ | $P_2S_5$ | LiCl | Number of revolutions (rpm) | Time (H) | Presence or absence of $H_2S$ | Temperature (° C.) | Time (H) |
| Ex. 1 | 1.9 | 0.5 | 1.6 | 370 | 72 | Absence | 430 | 8 |
| Ex. 2 | 1.9 | 0.5 | 1.6 | 370 | 36 | Absence | 420 | 48 |
| Ex. 3 | 2.1 | 0.5 | 1.4 | 370 | 72 | Absence | 430 | 4 |
| Ex. 4 | 1.9 | 0.5 | 1.5 | 370 | 72 | Absence | 500 | 8 |
| Comp. Ex. 1 | 2.6 | 0.5 | 0.9 | 370 | 8 | Absence | 430 | 8 |
| Comp. Ex. 2 | 1.6 | 0.5 | 1.9 | 370 | 8 | Absence | 500 | 10 |

Examples 5 to 12 and Comparative Examples 3 to 9

A sulfide solid electrolyte was prepared and evaluated in the same manner as in Example 1 except that raw material compositions and preparation conditions were changed as shown in Table 7. The results are shown in Tables 8 and 9.

In addition, all the sulfide solid electrolytes had electron conductivity less than $10^{-6}$ S/cm.

With regard to treatment of raw material powder in Comparative Example 5, the raw material powder was mixed by a planetary ball mill to such an extent that crystallinity of the raw material powder was able to be maintained, and the resultant material was taken as mixed powder.

Figure 4:
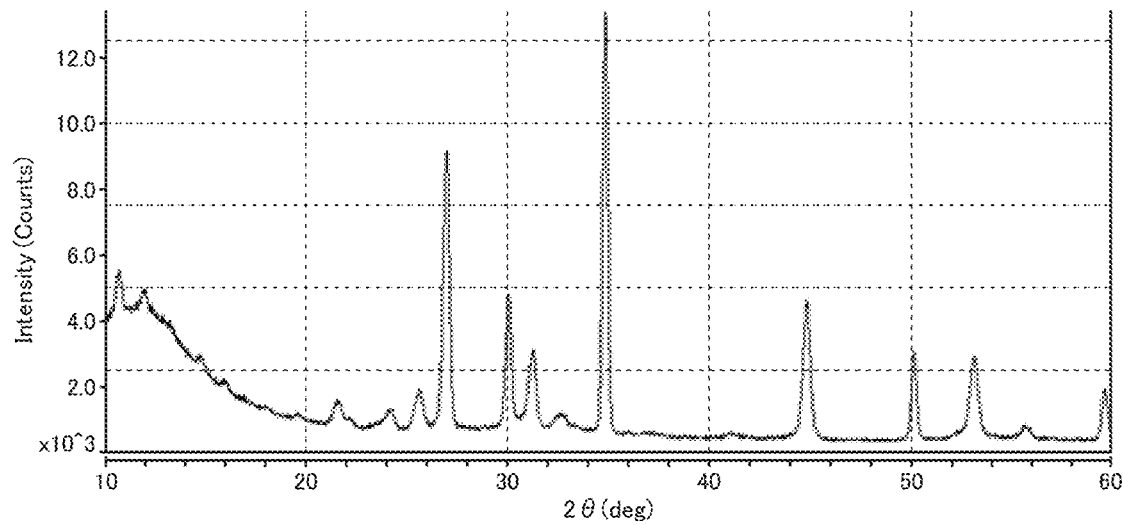
FIG. 4 is an XRD pattern of the mixed powder obtained in Comparative Example 5.

An XRD pattern of the resulting mixed powder is shown in FIG. 4. From the XRD pattern, peaks of $Li_2S$, $P_2S_5$ and LiCl as the raw materials were able to be confirmed, and the crystallinity of the raw material powder was maintained.

In a glove box in an atmosphere of argon, about 1.5 g of powder of the above-described intermediate was filled in a glass tube provided with a sealing function, and an end of the glass tube was sealed with a dedicated jig so as to avoid entry of air. Then, the glass tube was set in an electric furnace. The dedicated jig was inserted into a joint in the electric furnace, and the glass tube was connected with a glass circulation tube, and heat treatment was applied while circulating hydrogen sulfide at a flow rate of 20 mL/min.

Specifically, temperature was raised from room temperature to 500° C. (heated to 500° C. for 3 hours) at a rate of 2.5° C./min, and held at 500° C. for 4 hours. Then, the resultant material was gradually cooled to obtain a sulfide solid electrolyte.

TABLE 7

| | Amount of raw materials blended (molar ratio) | | | MM treatment conditions | | Heat treatment conditions | | |
|---|---|---|---|---|---|---|---|---|
| | Li₂S | P₂S₅ | LiCl | Number of revolutions (rpm) | Time (H) | Presence or absence of H₂S | Temperature (° C.) | Time (H) |
| Ex. 5 | 1.85 | 0.5 | 1.6 | 370 | 72 | Absence | 430 | 8 |
| Ex. 6 | 1.9 | 0.5 | 1.6 | 370 | 15 | Absence | 430 | 8 |
| Ex. 7 | 1.9 | 0.5 | 1.6 | 370 | 15 | Absence | 500 | 8 |
| Ex. 8 | 1.85 | 0.5 | 1.6 | 370 | 15 | Absence | 500 | 8 |
| Ex. 9 | 1.82 | 0.5 | 1.6 | 370 | 15 | Absence | 430 | 8 |
| Ex. 10 | 1.9 | 0.5 | 1.65 | 370 | 15 | Absence | 500 | 8 |
| Ex. 11 | 2.0 | 0.5 | 1.5 | 370 | 15 | Absence | 430 | 8 |
| Ex. 12 | 1.8 | 0.5 | 1.6 | 370 | 15 | Absence | 430 | 8 |
| Comp. Ex. 3 | 1.5 | 0.5 | 2.0 | 370 | 15 | Absence | 430 | 8 |
| Comp. Ex. 4 | 2.3 | 0.5 | 1.2 | 370 | 15 | Absence | 500 | 8 |
| Comp. Ex. 5 | 1.9 | 0.5 | 1.6 | * | * | Presence | 500 | 4 |
| Comp. Ex. 6 | 2.3 | 0.5 | 1.2 | 370 | 15 | Absence | 430 | 8 |
| Comp. Ex. 7 | 2.4 | 0.5 | 1.1 | 370 | 15 | Absence | 430 | 8 |
| Comp. Ex. 8 | 2.5 | 0.5 | 1.0 | 370 | 15 | Absence | 430 | 8 |
| Comp. Ex. 9 | 1.7 | 0.5 | 1.8 | 370 | 15 | Absence | 430 | 8 |

TABLE 8

| | Molar ratio of each element to phosphorus | | | | | Lattice constant (Å) | Intensity ratio $(I_A/I_B)$* of LiCl peak | Intensity ratio $(I_C/I_D)$* of Li₃PS₄ peak* | Ion conductivity (mS/cm) |
|---|---|---|---|---|---|---|---|---|---|
| | a (Li/P) | b (S/P) | c (Cl/P) | a − b | a + c | | | | |
| Ex. 5 | 5.3 | 4.3 | 1.7 | 1.0 | 7.0 | 9.795 | 0.007 | 0 | 10.7 |
| Ex. 6 | 5.3 | 4.3 | 1.6 | 1.0 | 6.9 | 9.807 | 0.015 | 0 | 9.6 |
| Ex. 7 | 5.3 | 4.3 | 1.7 | 1.0 | 7.0 | 9.810 | 0.018 | 0 | 9.2 |
| Ex. 8 | 5.4 | 4.2 | 1.7 | 1.2 | 7.1 | 9.812 | 0.017 | 0 | 8.9 |
| Ex. 9 | 5.3 | 4.2 | 1.7 | 1.1 | 7.0 | 9.813 | 0.019 | 0 | 8.8 |
| Ex. 10 | 5.2 | 4.3 | 1.7 | 1.0 | 6.9 | 9.817 | 0.014 | 0 | 8.2 |
| Ex. 11 | 5.7 | 4.6 | 1.5 | 1.0 | 7.1 | 9.819 | 0.022 | 0 | 8.0 |
| Ex. 12 | 5.3 | 4.1 | 1.7 | 1.2 | 7.0 | 9.819 | 0.023 | 0 | 7.9 |
| Comp. Ex. 3 | 5.5 | 4.2 | 2.0 | 1.3 | 7.4 | 9.822 | 0.101 | 0.060 | 5.3 |
| Comp. Ex. 4 | 5.8 | 4.7 | 1.3 | 1.1 | 7.1 | 9.831 | 0 | 0 | 6.4 |
| Comp. Ex. 5 | 5.5 | 4.4 | 1.7 | 1.1 | 7.2 | 9.832 | 0.055 | 0 | 2.7 |
| Comp. Ex. 6 | 5.8 | 4.7 | 1.3 | 1.1 | 7.1 | 9.846 | 0 | 0 | 4.3 |
| Comp. Ex. 7 | 5.9 | 4.9 | 1.1 | 1.0 | 7.0 | 9.848 | 0 | 0 | 4.0 |
| Comp. Ex. 8 | 6.0 | 4.9 | 1.0 | 1.1 | 7.0 | 9.855 | 0 | 0 | 3.2 |
| Comp. Ex. 9 | 5.2 | 4.2 | 1.8 | 1.0 | 7.0 | 9.825 | 0.083 | 0.020 | 6.5 |

*$I_A$ is intensity of a diffraction peak at 2θ = 50.3 ± 0.5 deg and $I_B$ is intensity of a diffraction peak at 2θ = 25.5 ± 0.5 deg. $I_C$ is intensity of a diffraction peak which is not a diffraction peak arising from the argyrodite-type crystal structure between diffraction peaks at 2θ = 17.6 ± 0.4 deg and 2θ = 18.1 ± 0.4 deg. $I_D$ is intensity of a diffraction peak at 2θ = 30.0 ± 0.5 deg.

TABLE 9

| | Area ratio of first peak (%) | Area ratio of second peak (%) | Area ratio of third peak (%) | Area ratio of $P_I$ (%) | Area ratio of $P_{II}$ (%) |
|---|---|---|---|---|---|
| Ex. 5 | 63.2 | 24.3 | 12.5 | 0 | 0 |
| Ex. 6 | 61.2 | 26.6 | 12.2 | 0 | 0 |
| Ex. 7 | 57.0 | 30.2 | 12.8 | 0 | 0 |
| Ex. 8 | 56.1 | 26.1 | 17.8 | 0 | 0 |
| Ex. 9 | 55.2 | 27.2 | 17.6 | 0 | 0 |
| Ex. 10 | 52.1 | 30.1 | 17.8 | 0 | 0 |
| Ex. 11 | 51.1 | 26.6 | 22.3 | 0 | 0 |
| Ex. 12 | 51.0 | 25.3 | 23.7 | 0 | 0 |
| Comp. Ex. 3 | 0.0 | 0.0 | 0.0 | 0 | 14.1 |
| Comp. Ex. 4 | 8.9 | 40.2 | 50.9 | 0 | 0 |
| Comp. Ex. 5 | 33.0 | 36.2 | 30.8 | 0 | 0 |
| Comp. Ex. 6 | 32.2 | 35.1 | 32.7 | 0 | 0 |
| Comp. Ex. 7 | 23.0 | 36.2 | 40.8 | 0 | 0 |
| Comp. Ex. 8 | 7.0 | 35.0 | 58.0 | 0 | 0 |
| Comp. Ex. 9 | 12.2 | 13.2 | 21.2 | 0 | 3.2 |

Several embodiments and/or Examples of the invention have been described in detail above, but those skilled in the art will readily modify the exemplary embodiments and/or Examples without substantially departing from new teachings and advantageous effects of the invention. Accordingly, all such modifications are included within the scope of the invention.

The entire contents of the description of the Japanese application serving as a basis of claiming the priority concerning the present application to the Paris Convention are incorporated by reference herein.

The invention claimed is:

1. A sulfide solid electrolyte, comprising:
Lithium;
Phosphorus;
Sulfur; and
chlorine,
wherein a molar ratio of the chlorine to the phosphorus, c (Cl/P), is greater than 1.0 and 1.9 or less, and the sulfide solid electrolyte has an argyrodite-type crystal structure having a lattice constant in a range of 9.750 Å to 9.820 Å.

2. The sulfide solid electrolyte according to claim 1, wherein a lattice constant of the argyrodite-type crystal structure is 9.795 Å or more and 9.820 Å or less.

3. The sulfide solid electrolyte according to claim 1, wherein a lattice constant of the argyrodite-type crystal structure is 9.795 Å or more and 9.815 Å or less.

4. The sulfide solid electrolyte according to claim 1, wherein the argyrodite-type crystal structure has diffraction peaks at 2θ=25.5±0.5 deg and 30.0±0.5 deg in powder X-ray diffraction using CuKα rays.

5. The sulfide solid electrolyte according to claim 1, wherein a molar ratio of the lithium to the phosphorus, a (Li/P), a molar ratio of the sulfur to the phosphorus, b (S/P), and the molar ratio of the chlorine to the phosphorus, c (C/P), satisfy formulas (A) to (C): 5.0≤a≤6.5 (A); 6.1≤a+c≤7.5 (B); and 0.5≤a−b≤1.5 (C), and b>0 and c>1.0 are satisfied.

6. The sulfide solid electrolyte according to claim 1, having a composition of formula (1): $Li_aPS_bCl_c$, (1),
wherein a to c satisfy formulas (A) to (C): 5.0≤a≤6.5 (A); 6.1≤a+c≤7.5 (B); and 0.5≤a−b≤1.5 (C), and b>0 and c>1.0 are satisfied.

7. The sulfide solid electrolyte according to claim 1, wherein, in powder X-ray diffraction using CuKα rays, the sulfide solid electrolyte does not have a diffraction peak at 2θ=50.3+0.5 deg, or, if the sulfide solid electrolyte has a diffraction peak, said diffraction peak satisfies formula (2), 0<$I_A/I_B$<0.05 (2), where $I_A$ represents intensity of a diffraction peak at 2θ=50.3±0.5 deg, and $I_B$ represents intensity of a diffraction peak at 2θ=25.5±0.5 deg.

8. The sulfide solid electrolyte according to claim 1, wherein, in powder X-ray diffraction using CuKα rays, the sulfide solid electrolyte does not have a diffraction peak (not a peak arising from an argyrodite-type crystal structure) at 2θ=17.6±0.4 deg and 2θ=18.1±0.4 deg, or, if the sulfide solid electrolyte has a diffraction peak, said diffraction peak satisfies formula (3), 0<$I_C/I_D$<0.05 (3), where $I_C$ represents intensity of a diffraction peak which is not a diffraction peak arising from the argyrodite-type crystal structure between the diffraction peaks at 2θ=17.6±0.4 deg and 2θ=18.1±0.4 deg, and $I_D$ represents intensity of a diffraction peak at 2θ=30.0±0.5 deg.

9. The sulfide solid electrolyte according to claim 1, wherein, in a solid $^{31}$P-NMR measurement, the sulfide solid electrolyte has a peak in each of regions 80.3 to 81.7 ppm, 82.4 to 83.7 ppm and 84.0 to 85.6 ppm; and an area ratio of the peak in the region of 80.3 to 81.7 ppm to a total area of all peaks in the region of 78 to 92 ppm is 40% or more.

10. An electrode mix, comprising the sulfide solid electrolyte according to claim 1 and an active material.

11. A lithium ion battery, comprising the electrode mix according to claim 10.

12. An electrode mix, produced from the sulfide solid electrolyte according to claim 1.

13. A lithium ion battery, comprising the electrode mix according to claim 12.

14. The sulfide solid electrolyte according to claim 4, wherein a molar ratio of the lithium to the phosphorus, a (Li/P), a molar ratio of the sulfur to the phosphorus, b (S/P), and the molar ratio of the chlorine to the phosphorus, c (Cl/P), satisfy formulas (A) to (C): 5.0≤a≤6.5 (A); 6.1≤a+c≤7.5 (B); and 0.5≤a−b≤1.5 (C), and b>0 and c>1.0 are satisfied.

15. The sulfide solid electrolyte according to claim 4, having a composition represented by formula (1), $Li_aPS_bCl_c$ (1),
wherein a to c satisfy formulas (A) to (C): 5.0≤a≤6.5 (A); 6.1≤a+c≤7.5 (B); and 0.5≤a−b≤1.5 (C), and b>0 and c>1.0 are satisfied.

16. The sulfide solid electrolyte according to claim 4, wherein, in powder X-ray diffraction using CuKα rays, the sulfide solid electrolyte does not have a diffraction peak at 2θ=50.3±0.5 deg, or, if the sulfide solid electrolyte has a diffraction peak, said diffraction peak satisfies formula (2), 0<$I_A/I_B$<0.05 (2), where $I_A$ represents intensity of a diffraction peak at 2θ=50.3±0.5 deg, and $I_B$ represents intensity of a diffraction peak at 2θ=25.5±0.5 deg.

17. The sulfide solid electrolyte according to claim 4, wherein, in a solid $^{31}$P-NMR measurement, the sulfide solid electrolyte has a peak in each of regions 80.3 to 81.7 ppm, 82.4 to 83.7 ppm and 84.0 to 85.6 ppm; and an area ratio of the peak in the region of 80.3 to 81.7 ppm to a total area of all peaks in the region of 78 to 92 ppm is 40% or more.

18. The sulfide solid electrolyte according to claim 5, wherein, in powder X-ray diffraction using CuKα rays, the sulfide solid electrolyte does not have a diffraction peak at 2θ=50.3±0.5 deg, or, if the sulfide solid electrolyte has a diffraction peak, said diffraction peak satisfies formula (2), 0<$I_B$<0.05 (2), where $I_A$ represents intensity of a diffraction peak at 2θ=50.3±0.5 deg, and $I_n$ represents intensity of a diffraction peak at 2θ=25.5±0.5 deg.

19. The sulfide solid electrolyte according to claim 5, wherein, in a solid $^{31}$P-NMR measurement, the sulfide solid electrolyte has a peak in each of regions 80.3 to 81.7 ppm, 82.4 to 83.7 ppm and 84.0 to 85.6 ppm; and an area ratio of the peak in the region of 80.3 to 81.7 ppm to a total area of all peaks in the region of 78 to 92 ppm is 40% or more.

20. The sulfide solid electrolyte according to claim 6, wherein, in powder X-ray diffraction using CuKα rays, the sulfide solid electrolyte does not have a diffraction peak at 2θ=50.3±0.5 deg, or, if the sulfide solid electrolyte has a diffraction peak, said diffraction peak satisfies formula (2), 0<$I_A/I_B$<0.05 (2), where $I_A$ represents intensity of a diffraction peak at 2θ=50.3±0.5 deg, and $I_B$ represents intensity of a diffraction peak at 2θ=25.5±0.5 deg.

21. The sulfide solid electrolyte according to claim 6, wherein, in a solid $^{31}$P-NMR measurement, the sulfide solid electrolyte has a peak in each of regions 80.3 to 81.7 ppm, 82.4 to 83.7 ppm and 84.0 to 85.6 ppm; and an area ratio of the peak in the region of 80.3 to 81.7 ppm to a total area of all peaks in the region of 78 to 92 ppm is 40% or more.

22. The sulfide solid electrolyte according to claim 7, wherein, in a solid $^{31}$P-NMR measurement, the sulfide solid electrolyte has a peak in each of regions 80.3 to 81.7 ppm, 82.4 to 83.7 ppm and 84.0 to 85.6 ppm; and an area ratio of the peak in the region of 80.3 to 81.7 ppm to a total area of all peaks in the region of 78 to 92 ppm is 40% or more.

\* \* \* \* \*